UNITED STATES PATENT OFFICE.

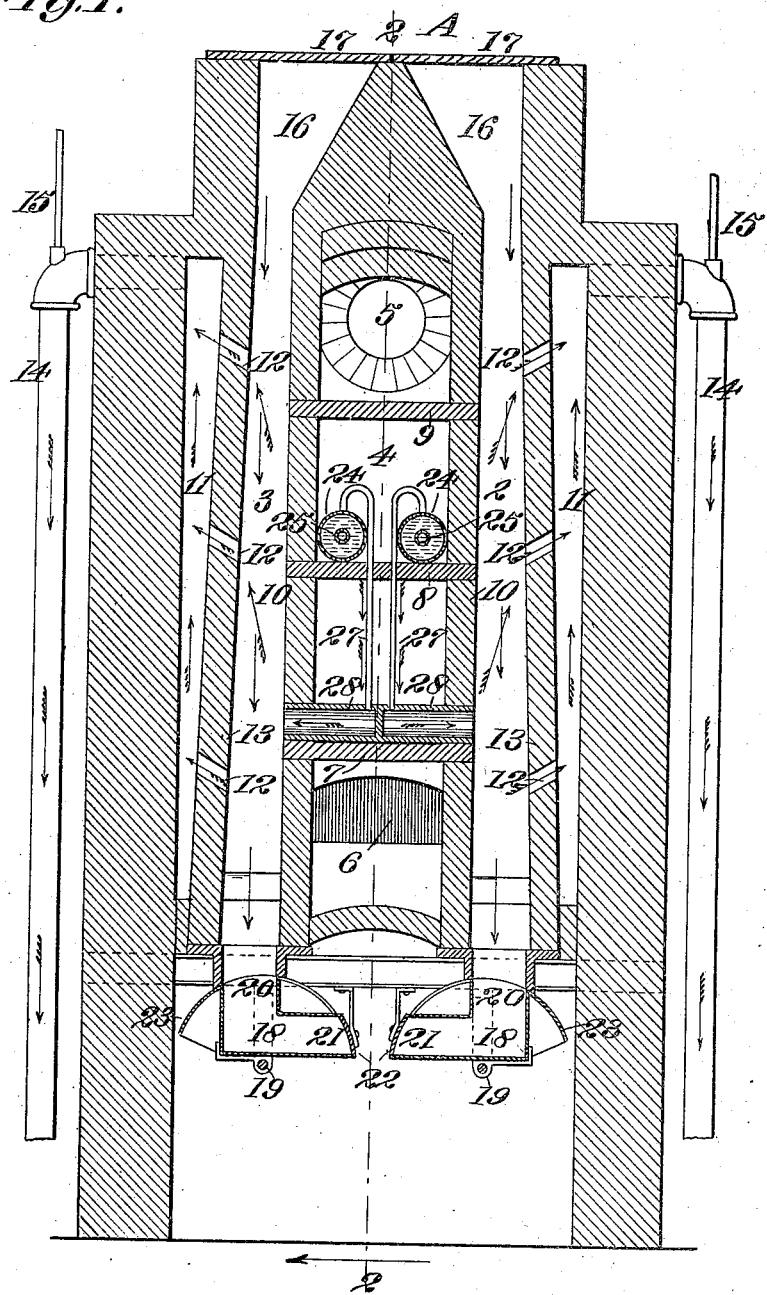

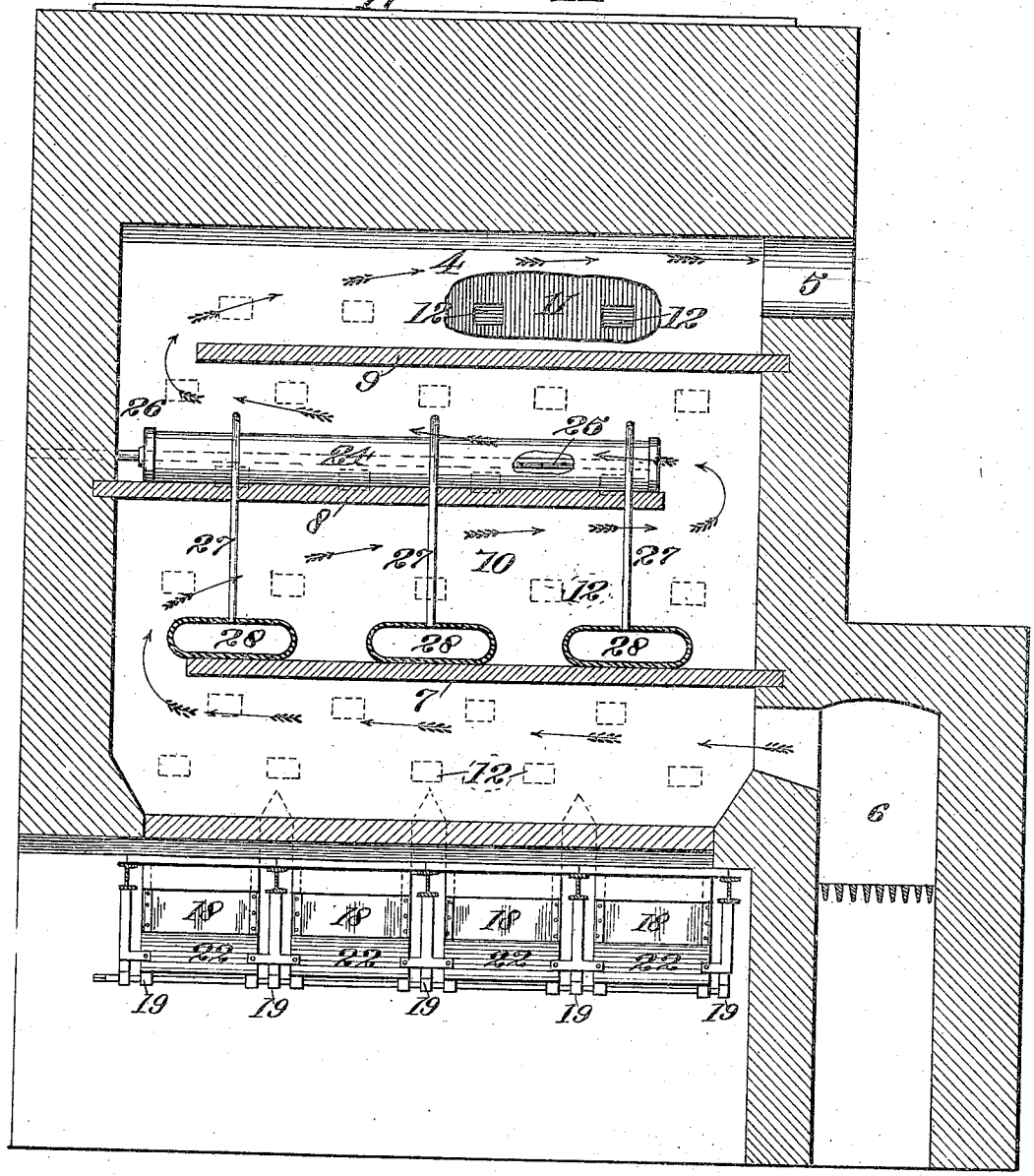

ANDREW W. LIVINGSTON, OF OAKLAND, CALIFORNIA.

ROASTING-FURNACE.

1,242,455.    Specification of Letters Patent.    Patented Oct. 9, 1917.

Application filed May 22, 1915. Serial No. 29,813.

*To all whom it may concern:*

Be it known that I, ANDREW W. LIVINGSTON, a citizen of the United States, residing at Oakland, in the county of Alameda and State of California, have invented new and useful Improvements in Roasting-Furnaces, of which the following is a specification.

This invention relates to a roasting furnace for handling ores containing volatile minerals, such as zinc, cinnabar, antimony, and the like.

One of the objects of the present invention is to provide a simple, substantial, easily operated furnace having means for continuously feeding and discharging the ore to be treated. Another object of the invention is to provide means for continuously removing the fumes or volatile products liberated at the lowest possible temperature to facilitate condensation and to eliminate deoxidation. Another object is to provide means for admitting oxygen to the roasting chamber at a desired temperature either in the form of heated air or decomposed steam. Further objects will hereinafter appear.

The invention consists of the parts and the construction and combination of parts as hereinafter more fully described and claimed, having reference to the accompanying drawings, in which—

Figure 1 is a cross section of the furnace.

Fig. 2 is a longitudinal section on line 2—2, Fig. 1.

Referring to the drawings, A indicates the furnace in general. The furnace is double in arrangement as it contains two roasting chambers 2 and 3 which are separated by a central flue chamber 4. The upper end of the flue chamber connects with a stack (not here shown) by means of a horizontally disposed discharge flue 5, and the lower end of the flue chamber is directly connected with a combustion chamber or furnace, such as indicated at 6. The heat from the furnace, passing through the flue chamber, is directed by a series of superposed baffle plates, such as indicated at 7, 8 and 9, to equally distribute the heat throughout the flue chamber, and this heat is conducted through the exterior walls 10 of the flue chamber to the roasting chambers 2 and 3, as shown.

Mounted on the side of each roasting chamber 2 and 3 is a fume collecting chamber 11. This chamber 11 increases in area from bottom to top, having a larger area at the top to permit a free passage of the fumes therethrough. The fumes or volatile products liberated by the rock or ore contained in the roasting chambers is conveyed to the fume collecting chambers by a plurality of openings 12 formed in the wall 13 which separates the roasting chamber from the fume chamber; these openings 12 being preferably set on an incline, as indicated, to prevent the ore from clogging the openings or partly filling the same. The top of each fume chamber 11 is connected with a pipe 14, the lower end of which may be connected with a condenser of any suitable construction. Partial condensation of the volatile products liberated from the ore and passing through the fume chamber takes place in pipe 14, as a spray nozzle, such as indicated at 15, is mounted at the upper end of each pipe. Water discharged through said nozzle striking the hot fumes passing through the pipe not only partly condenses the volatile products or fumes, but also cools same to such an extent as to form sufficient vacuum to create a free circulation or complete removal of the fumes from the roasting chambers.

The furnace proper is preferably built of brick and lined with fire-brick or like refractory material. The upper end of each roasting chamber 2—3 is preferably hopper-shaped, as indicated at 16, to receive the ore and said hoppers may be closed, if desired, by means of the covers indicated at 17. Each roasting chamber increases in area from top to bottom. Being of smaller area at the top it prevents the ore from clogging or tamping at any point and at the same time it permits the ore to settle by gravity as it is reduced and partly consumed in the roasting chambers.

Mounted at the lower end of each roasting chamber is a plurality of discharge gates 18. These gates are preferably hinged, as indicated at 19, and are provided with intake openings 20 and discharge openings 21. The gates normally assume the position shown in Fig. 1. Here the discharge openings are closed by a stationary plate 22 while the intake openings are in register with the bottom of the roasting chambers. The ore will thus gradually fill the chambers formed within the gates 18 and when filled will be tilted and dump at intervals into a car (not here shown).

Formed on the rear side of each gate is a flange 23. This swings into register with the lower discharge opening of the roasting chamber and closes same while the gate is turned into the dumping position. A practically continuous discharge from the roasting chamber is thus possible without disturbing the main body of ore contained therein, and it is similarly possible to continuously admit or fill in ore at the top of the roasting chamber as it is only necessary to move cover 17 to fill the hopper portion 16.

Mounted in flue chamber 4, between the baffle plates 8 and 9, is a plurality of horizontally disposed tanks 24, and extending through each tank is a perforated pipe 25. These pipes are preferably perforated throughout their length and one end of each pipe is connected with a source of water supply by means of a pipe 26. Water admitted through pipe 26 will thus be discharged in the form of a spray interiorly of each tank 24 and it is immediately turned into steam as the tanks 24 are highly heated, being positioned directly in the path of the products of combustion passing through the flue chamber. This steam is permitted to escape through a plurality of pipes 27 which connect down to retorts 28. The steam is here superheated preferably to a point of decomposition and is permitted to escape from the retorts directly into the roasting chamber. The heated gases liberated by the decomposition of the steam being discharged directly into the ore body contained within the roasting chamber assists combustion at this point and raises the temperature to a certain extent depending upon the amount of gases introduced.

As an alternative means of admitting oxygen to the roasting chamber under a desired temperature it is possible to admit air through pipe 26. This air passing through the tanks 24 and retorts 28 is heated to the desired temperature and finally discharged into the ore body contained within the roasting chamber, causing an increase in temperature in this chamber.

A furnace constructed as here shown is not only simple in construction and easy to operate, but it also permits of a practically continuous feed and discharge of the ore to be treated. It, furthermore, permits the fumes or volatile products to be liberated at the lowest possible temperature, thus facilitating condensation and eliminating deoxidization. The increasing area or tapering construction of the roasting chamber prevents tamping of the ore at any point, thus permitting it to settle by gravity as it is consumed or treated. The tapered construction of the fume collecting chambers permits a free circulation and flow therethrough, as the increasing area or cubic capacity increases as the fumes arise.

The products of combustion from the furnace proper will in this instance have no opportunity of mixing with or escaping through the fume chamber as the heat from the combustion chamber passes directly through the central flue chamber to the stack; the heat thus generated being radiated through the walls of the central flue chamber to the ore body contained within the roasting chamber. The ore is thus not directly exposed to the products of combustion and no mixing of the volatile products liberated will take place.

While I have shown the invention arranged with multiple roasting chambers, it is manifest that there may be one or more of such chambers. The important feature of this invention is the employment of a relatively thin roasting chamber adapted to contain a comparatively thin sheet of ore disposed on edge and to heat this ore from the side from a suitable source of heat, withdrawing the vaporizable values from the opposite side through the fume chambers, or suction chambers 11. If desired, the vaporization is accelerated through the introduction of the steam or other heated oxygenized fluid.

The process is made practically continuous by maintaining a constant source of supply at the top and a constant withdrawal at the bottom of the roasting chamber. The inverted wedge-like shape of the roasting chamber, that is, tapered from the bottom upward, tends to an increased porosity of the inclosed sheet of ore, so that the process is further accelerated.

The materials and finish of the several parts of the device are such as the experience and judgment of the manufacturer may dictate.

I wish it understood that various changes in form, proportions, and minor details of construction may be resorted to within the scope of the appended claims and that I do not wish to limit myself to the specific design and construction here shown.

Having thus described my invention what I claim and desire to secure by Letters Patent is—

1. A furnace for roasting ores containing vaporizable minerals, comprising in combination a vertically disposed roasting chamber which is relatively thin transversely so as to contain a relatively thin layer or sheet of ore, a source of heat at one side of the roasting chamber and separated therefrom by imperforate walls through which the heat is transferred into the relatively thin sheet of ore, a suction chamber on the other side of the roasting chamber opposite the source of heat, said suction chamber connected by flues through the walls of the roasting chamber, and means for creating a suction therethrough.

2. An apparatus for continuously roasting ores containing vaporizable minerals, comprising in combination a vertically disposed roasting chamber which is relatively thin transversely so as to contain a relatively thin layer or sheet of ore, a source of heat at one side of the roasting chamber and separated therefrom by imperforate walls through which the heat is transferred into the relatively thin sheet of ore, a suction chamber on the other side of the roasting chamber opposite the source of heat, said suction chamber connected by flues through the walls of the roasting chamber, means for creating a suction therethrough, and means permitting the practically continuous introduction and withdrawal of ore from the roasting chamber.

3. A furnace for roasting ores containing vaporizable minerals, comprising in combination a vertically disposed roasting chamber which is relatively thin transversely so as to contain a relatively thin layer or sheet of ore, a source of heat at one side of the roasting chamber and separated therefrom by imperforate walls through which the heat is transferred into the relatively thin sheet of ore, a suction chamber on the other side of the roasting chamber opposite the source of heat, said suction chamber connected by flues through the walls of the roasting chamber, said chamber being narrower at the top than at the bottom.

4. A roasting furnace having a flue chamber formed therein adjacent a roasting chamber and separated therefrom by an imperforate wall, a heating furnace connected with the flue chamber, a fume collecting chamber formed in the furnace exteriorly of the roasting chamber, a plurality of superposed openings formed in the furnace forming communication between the roasting chamber and fume collecting chamber, and means for producing a partial vacuum in the fume collecting chamber to constantly withdraw the fumes or volatile products liberated from the ore in the roasting chamber.

5. A roasting furnace having a flue chamber formed therein and a roasting chamber on each side thereof and separated therefrom by imperforate walls, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, and means permitting the practically continuous feeding and removing of the ore from the roasting chambers.

6. A roasting furnace having a flue chamber formed therein and a roasting chamber on each side thereof and separated therefrom by imperforate walls, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, and means for evenly distributing the heat from the heating furnace throughout the flue chamber.

7. A roasting furnace having a flue chamber formed therein and a roasting chamber on each side thereof and separated therefrom by imperforate walls, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, means permitting the practically continuous feeding and removing of the ore from the roasting chambers, and means for evenly distributing the heat from the heating furnace throughout the flue chamber.

8. A roasting furnace having a flue chamber formed therein and a roasting chamber on each side thereof, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, and means for heating air and admitting same to the roasting chamber while preventing access of flue gases thereto.

9. A roasting furnace having a flue chamber formed therein and a roasting chamber, a heating furnace connected with the flue chamber, means for constantly withdrawing the volatile products liberated from the ore in the roasting chamber, means permitting the practically continuous feeding and removing of the ore from the roasting chambers, and means for heating air and admitting same substantially uncontaminated by furnace gases, to the roasting chamber.

10. A roasting furnace having a flue chamber formed therein and a roasting chamber, a heating furnace connected with the flue chamber, means for constantly withdrawing the volatile products liberated from the ore in the roasting chamber, and means in the flue chamber for heating air and admitting same substantially uncontaminated by furnace gases to the roasting chamber.

11. A roasting furnace having a flue chamber formed therein and a roasting chamber on each side thereof and separated therefrom by imperforate walls, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, means permitting the practically continuous feeding and removing of the ore from the roasting chambers, and means for heating air and admitting same to the roasting chamber.

12. A roasting furnace having a flue chamber formed therein and a roasting chamber on each side thereof and separated therefrom by an imperforate wall, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, means permitting the practically continuous feeding and removing of the ore from the roasting chambers, means for evenly distributing the heat from the heating furnace throughout the flue chamber, and means for heating air and admitting same to the roasting chamber.

13. A roasting furnace having a flue chamber formed therein and a roasting chamber on each side thereof, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, and means for decomposing steam and admitting same to the roasting chamber.

14. A roasting furnace having a flue chamber formed therein and a roasting chamber on each side thereof, a heating furnace connected with the flue chamber, means for constantly withdrawing the volatile products librated from the ore in the roasting chamber, means for practically continuously feeding and removing the ore from the roasting chambers, and means for superheating steam and admitting same to the roasting chamber.

15. A roasting furnace having a flue chamber formed therein and a roasting chamber on each side thereof, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, means for continuously feeding and removing the ore from the roasting chambers, and means for superheating steam and admitting same to the roasting chamber.

16. A roasting furnace having a flue chamber formed therein and a roasting chamber on each side thereof, a heating furnace connected with the flue chamber, means for constantly withdrawing the volatile products liberated from the ore in the roasting chamber, means for evenly distributing the heat from the heating furnace throughout the flue chamber, and means for superheating steam and admitting same to the roasting chamber.

17. A roasting furnace having a flue chamber formed therein and a roasting chamber on each side thereof and separated therefrom by an imperforate wall, a heating furnace connected with the flue chamber, a fume collecting chamber formed in the furnace exteriorly of each roasting chamber, a plurality of superposed openings formed in the furnace forming communication between each roasting chamber and fume collecting chamber, means for producing a partial vacuum in each fume collecting chamber to constantly withdraw the fumes or volatile products liberated from the ore in the roasting chamber, means permitting the practically continuous feeding and removing of the ore from the roasting chambers, means for evenly distributing the heat from the heating furnace throughout the flue chamber, and means for decomposing or superheating steam and admitting same to the roasting chamber.

18. A roasting furnace having a flue chamber formed therein and a narrow roasting chamber on each side thereof, said roasting chambers being closed by an inclined wall on one side to produce a narrow roasting chamber which gradually increases in area from top to bottom, a heating furnace connected with the flue chamber, and means for constantly withdrawing the volatile products liberated from the ore in the roasting chamber.

19. A roasting furnace having a flue chamber formed therein and a roasting chamber on each side thereof, said roasting chambers being closed by an inclined wall on one side to produce a chamber which gradually increases in area from top to bottom, a fume collecting chamber formed in the furnace exteriorly of each inclined wall, said chambers increasing in area from the bottom to the top, a plurality of openings formed in the inclined walls forming communication between the roasting chambers and the adjacent fume collecting chambers, means for producing a partial vacuum in each fume collecting chamber to constantly withdraw the fumes or volatile products liberated from the ore in the roasting chambers, and a heating furnace connected with the flue chamber.

20. A roasting furnace having a flue chamber formed therein and a roasting chamber on each side thereof, said roasting chambers being closed by an inclined wall on one side to produce a chamber which gradually increases in area from top to bottom, a fume collecting chamber formed in the furnace exteriorly of each inclined wall, said chambers increasing in area from the bottom to the top, a plurality of openings formed in the inclined walls forming communication between the roasting chambers and the adajcent fume collecting chambers, means for producing a partial vacuum in each fume collecting chamber to constantly withdraw the fumes or volatile products liberated from the ore in the roasting chambers, a heating furnace connected with the flue chamber, ore receiving hoppers connected with the upper end of each roasting chamber, and pivotally mounted dumping gates mounted below the roasting chambers.

21. A roasting furnace having a flue chamber formed therein and a roasting chamber on each side thereof, said roasting chambers being closed by an inclined wall on one side to produce a chamber which gradually increases in area from top to bottom, a fume collecting chamber formed in the furnace exteriorly of each inclined wall, said chambers increasing in area from the bottom to the top, a plurality of openings formed in the inclined walls forming communication between the roasting chambers and the adjacent fume collecting chambers, means for producing a partial vacuum in each fume collecting chamber to constantly withdraw the fumes or volatile products liberated from the ore in the roasting chambers, a heating furnace connected with the flue chamber, a pair of heating tanks mounted in the flue chamber, a spray pipe interiorly of each tank, means for conveying water to said spray pipes, pipes connecting the heating tanks with retorts mounted in the flue chamber to superheat or decompose the steam generated in the heating tanks, and means for conveying the steam from the retorts to the roasting chambers.

22. A roasting furnace having a flue chamber formed therein and a roasting chamber on each side thereof, said roasting chambers being closed by an inclined wall on one side to produce a chamber which gradually increases in area from top to bottom, a fume collecting chamber formed in the furnace exteriorly of each inclined wall, said chambers increasing in area from the bottom to the top, a plurality of openings formed in the inclined walls forming communication between the roasting chambers and the adjacent fume collecting chambers, means for producing a partial vacuum in each fume collecting chamber to constantly withdraw the fumes or volatile products liberated from the ore in the roasting chambers, a heating furnace connected with the flue chamber, a pair of heating tanks mounted in the flue chamber, a spray pipe interiorly of each tank, means for conveying water to said spray pipes, pipes connecting the heating tanks with retorts mounted in the flue chamber to superheat or decompose the steam generated in the heating tanks, means for conveying the steam from the retorts to the roasting chambers, and means for continuously feeding and discharging the ore in the roasting chambers.

In testimony whereof I have hereunto set my hand in the presence of two subscribing witnesses.

ANDREW W. LIVINGSTON.

Witnesses:
W. F. HITE,
C. A. QUIEROLO.